US Patent Office

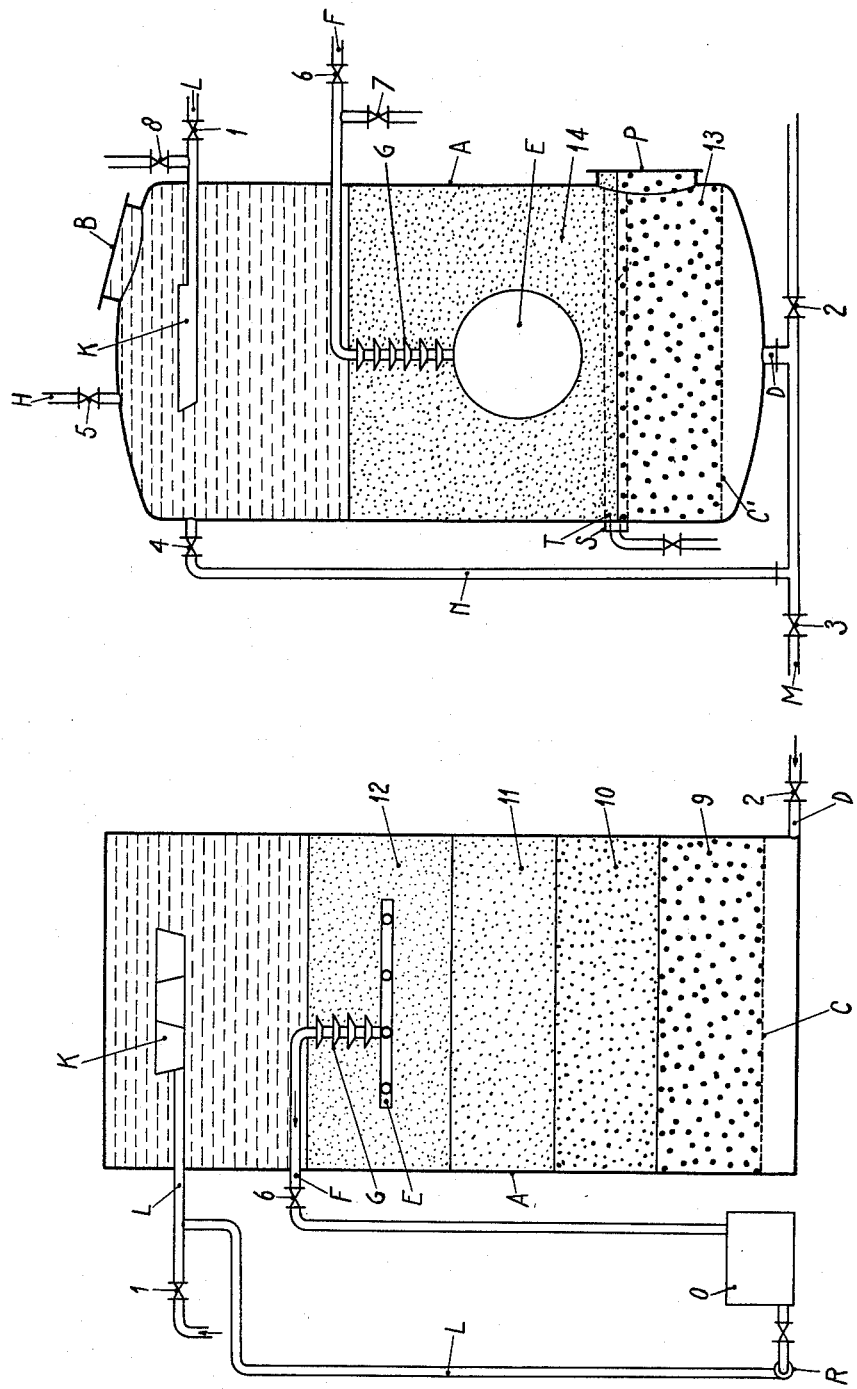

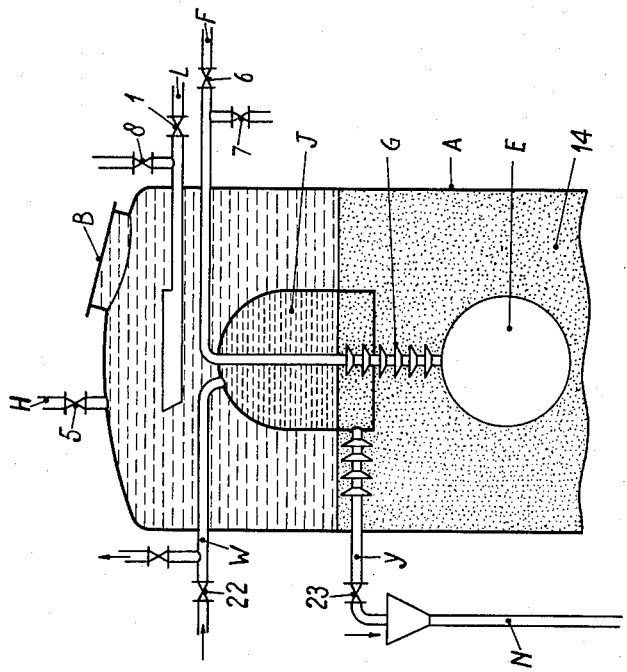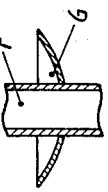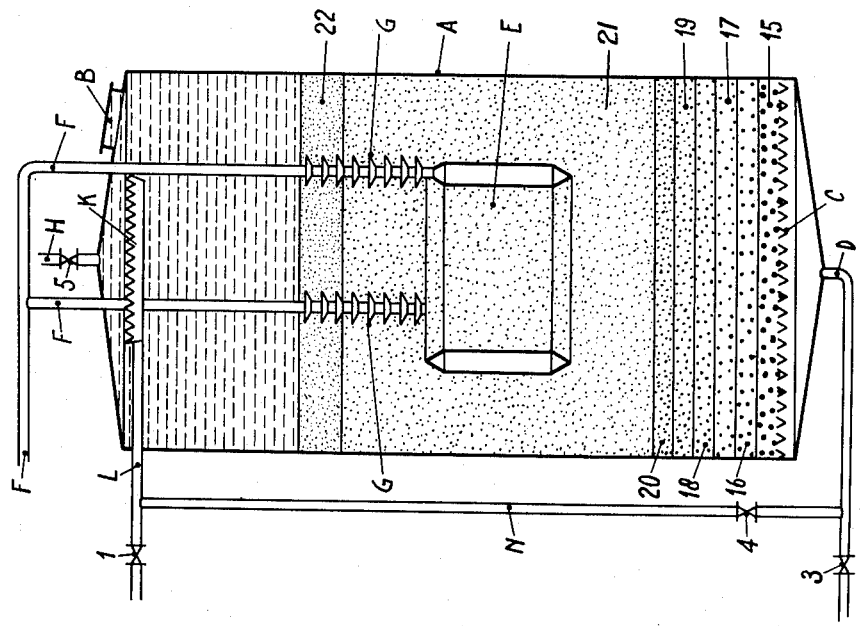

2,723,761
Patented Nov. 15, 1955

2,723,761

METHOD AND DEVICE FOR THE PURIFICATION OR PREPARATION OF LIQUIDS

Dirk van der Made, Puttershoek, and Pieter Smit, Santpoort, Netherlands; said van der Made assignor to Cooperatieve Suikerfabriek en Raffinaderij G. A. "Puttershoek," Puttershoek, Netherlands, a corporation of the Netherlands Application February 16, 1950, Serial No. 144,464

Claims priority, application Netherlands February 24, 1949

7 Claims. (Cl. 210—134)

The present invention relates to filters for the purification of liquids, and more particularly to filters comprising a filterbed of granular material.

An object of the invention is the provision of a filter of this character which, as compared with conventional filters, will filter a comparatively large volume of liquid before it becomes clogged to a point where cleaning or reconditioning of the filterbed material is required.

A further object of the invention is the provision of a filter which will filter particles of colloidal size and which is also adapted to operate as an ion exchanger.

Another object of the invention resides in the provision of a filter in which direct access to the filter outlet by unfiltered or only partially filtered liquid is prevented, notwithstanding the tendency of the liquid being forced through the filter to form relatively direct and unimpeded leakage paths through the granular material of the filterbed.

In general, the invention comprises a container which may be closed, or which may be open at its top. A transversely extending liquid permeable supporting member is disposed in the bottom portion of the container. A filterbed of granular material rests on the supporting member and completely fills the central portion of the container above the supporting member, leaving a freeboard space above the top of the filterbed. The grain size of the granular material decreases progressively upwardly from the bottom of the filterbed to its top. A hollow foraminous straining member is embedded in the top portion of the filterbed and is provided with liquid permeable walls, the permeable walls being completely covered by a sufficient quantity of the relatively fine granular material in the top portion of the filterbed so that unfiltered or partially filtered liquid cannot enter through the walls of the drainage member directly, all liquid being constrained to pass through an appreciable amount of the finer granular material before it can enter the foraminous straining member and pass into the filter outlet.

A second filter outlet for use when washing the filterbed communicates with the free-board space within the container above the filterbed. Valves are provided for shutting off the second, or wash liquid outlet, during liquid purification while purified liquid is entering the foraminous straining member and being delivered to the first, or service outlet of the filter. When washing the filterbed, these valves permit the service outlet to be closed and the wash water outlet to be opened. The liquid flow rate may then be increased, if required, so that the filterbed expands upwardly into the free-board space and the wash liquid is skimmed off the top of the filterbed while it is in this expanded condition and relatively free access to all of the surfaces of the granular material is available to the wash liquid. After washing has been completed, the wash outlet is closed and the service outlet is opened by means of the valves. The granular material is allowed to settle before filtering operation is commenced and the larger size grains will settle rapidly and automatically assume their former positions at the bottom of the filterbed. The smallest size grains will settle more slowly and resume their positions in the top portion of the filterbed.

Additionally, saucer-shaped baffle members are spaced along an outlet duct which passes through the filterbed into the free-board space in order to prevent the formation of longitudinal leakage paths from the filterbed into the free-board space along the external surface of the duct.

Means are provided for maintaining downward pressure above the top of the filterbed for counteracting the upward pressure of the liquid to be purified which is being forced upwardly through the granular material. This downward pressure tends to compact the filterbed during liquid purification and also opposes the tendency of the liquid undergoing purification to break through the filterbed by displacing the granular material and forming direct channels leading to the filter outlet, particularly at the inner lateral surfaces of the container and along the external surfaces of ducts which pass through the filterbed.

Means are also provided for recirculating a portion of the purified liquid and re-introducing it into the free-board space above the filterbed for maintaining a filterbed compacting counterpressure as described above.

Various other objects, features and advantages of the invention will become apparent upon reading the following specification together with the accompanying drawing forming a part hereof.

Referring to the drawing:

Figure 1 is a diagrammatic view in sectional elevation showing a filter embodying the invention.

Figure 2 is a view similar to Fig. 1, showing a modified form of filter comprising a spherically shaped foraminous straining member.

Figure 3 shows still another modified form of filter in which a grate formed of angle bars is used to support the filterbed, the foraminous straining member being of annular shape.

Figure 4 is a fragmentary view showing a modified form of the filter of Fig. 2 in which a bell-shaped member extends downwardly into the filterbed above the foraminous straining member for applying increased downward pressure to that portion of the filterbed which is immediately above the foraminous straining member.

Figure 5 is an enlarged fragmentary view showing a saucer-shaped baffle member.

Referring to Fig. 1, an upright closed filter container A is shown with a transversely extending supporting member C spaced above the bottom of the container. The container A may have any desired transverse cross-sectional configuration, a cylindrical container being preferred. The supporting member C may take the form of a perforated plate, suitably strengthened as required to support a filterbed consisting of four layers 9, 10, 11 and 12 of granular material. The grain size of the material decreases progressively proceeding upwardly from the supporting member C to the top of the filterbed 9—10—11—12. For filtering hard water which has been softened by treatment with aluminum sulphate, for example, the material in layer 9 may conveniently be gravel of 10 to 20 millimeter (mm.) size, in layer 10, gravel of 10 to 20 millimeter (mm.) size; in layer 10, 1½ to 2 mm. For a filtering rate of 10 cubic meters per hour, the overall height of the filterbed may be 3½ meters with a cross-sectional area of 2 square meters, the thicknesses of the respective layers 9 to 12 being 500 mm., 500 mm., 500 mm. and 700 mm.

A foraminous straining member E is embedded in the finest layer 12 and consists of a network of horizontally extending perforated pipes enclosed by one or more layers of screening of suitable mesh to prevent the granular material in the layer 12 from entering the perforations of the pipes.

The liquid to be purified or otherwise treated by contact with the granular material enters the bottom of the container A through an inlet duct D controlled by an inlet valve 2. The liquid flows upwardly, passing successively through the filterbed layers 9, 10, 11 and 12 of which the grain size decreases progressively as described above. In the uppermost layer 12, after having been filtered, it enters the foraminous straining member E and leaves the filter container A through a first or service outlet duct F controlled by an outlet valve 6.

The outlet duct F extends downwardly, carrying the filtered liquid to a tank O and a portion (about 10%) of the filtered liquid enters a recirculation pump R. From the pump R the recirculated filtered liquid passes upwardly through a duct L to a recirculation and wash liquid outlet member K spaced above the top of the filterbed.

The recirculated liquid admitted to the free-board space above the top surface of the filterbed applies a downward pressure thereto which counteracts the upward pressure of the liquid entering through the inlet duct D at the bottom of the container A. This downward counter pressure tends to compact the filterbed during operation of the filter and also opposes the tendency of the upwardly flowing liquid to break through and form direct leakage channels passing through the granular material to the foraminous straining member E or to form direct leakage channels leading upwardly past the filterbed along the inner lateral surfaces of the container A. If the container A is open at its top, the amount of downward pressure will be limited by the height of the container above the top of the filterbed. If the container A is completely closed, the amount of downward counter pressure may be increased to a greater value, as determined by the outlet pressure of the recirculation pump R.

When the filterbed becomes clogged, the granular material may be cleaned by introducing a washing mixture of air and water into the inlet duct D at a rate of 120 cubic meters per hour (12 times the normal filtering rate). The outlet valve 6 is closed during the cleaning operation to prevent the dirty wash liquid from entering the tank O for the purified liquid and the valve 1 is open which allows the washing mixture to enter the recirculation member K and be discharged as waste through the valve 1.

Since the filterbed material is washed by upward flow at a highly increased rate, the filterbed will expand upwardly into the free-board space and the granular material of finest grain size will rise to the highest portion of the expanded filterbed. When the high rate washing flow is stopped, the coarsest material will settle to the bottom of the container first and come to rest on the supporting member C followed by progressively finer grains which settle more slowly and will rest on the coarser grains. In this manner, the arrangement of the granular filterbed material with the grain size progressively decreasing from the bottom of the filterbed to its top is inherently restored to its original condition after each washing.

The washing liquid may be varied to suit the type of treatment being applied to the liquid and the nature of the liquid being purified. If the granular material becomes acidified in the course of operation, for example, the washing liquid may be required to be alkaline in order to neutralize the acid and restore the filterbed material to an initial neutral or alkaline condition so that the further treatment of liquid by the filter may proceed.

To prevent pressure differentials of liquid in different portions of the filterbed from creating any direct leakage channel leading along the external surface of the vertical portion of the outlet duct F between the top of the filterbed and the foraminous straining member E, a series of saucer-shaped baffle members G (see Fig. 5) are disposed in longitudinally spaced relationship along the vertically extending portion of the outlet duct F within the uppermost filterbed layer 12. This arrangement prevents the direct flow of liquid along the external vertical surface of the outlet duct F which would tend to create leakage paths leading directly to the foraminous straining member E.

Fig. 2 shows a modified form of filter suitable for the clarification of sugar beet juice. The container A is completely closed and its top and bottom walls are dished to withstand internal pressure. Manhole covers B and P provide access to the upper and lower portions, respectively, of the container A for purposes of filling or inspection. An air vent duct H at the top of the container is controlled by a valve 5. In this case, the internal surfaces of the container A are suitably treated to be acid resistant.

The filterbed of Fig. 2 is shown comprising only two distinct layers of granular material, the lower layer 13 being composed of gravel of 10 millimeter grain size and the upper layer 14 consisting of a granular cation-exchanging material having a grain size of less than 0.5 millimeter, the cation-exchanging material being known as "Dusarit."

The foraminous straining member E is of hollow spherical configuration and is preferably formed of stainless steel. The foraminous straining member E is imbedded in the central portion of the upper layer 14 and is suitably perforated for the admission of filtered liquid. The external surface of the spherical foraminous straining member E is covered by Monel metal gauze of sufficiently fine mesh to admit the filtered liquid and to exclude the granular filterbed material.

The recirculation member K is in the form of an upwardly turned horizontal circular dish. An annular tube S with peripherally distributed injectors T is disposed between the upper and lower layers 14 and 13, respectively, for the admission of steam or other washing fluids for reconditioning the upper layer 14.

In operation, raw sugar beet juice is supplied through the inlet duct M and enters the bottom of the container through the inlet connection D, the wash valve 2 being closed. A certain amount of raw juice flows upwardly through the vertical duct N and the valve 4 to maintain liquid under pressure above the top of the filterbed. The valves 5, 8 and 1 at the top of the container A are closed. The filtered liquid enters the spherical foraminous straining member E and leaves the filter through an outlet duct F which passes vertically upwardly through the upper layer 14 and thence horizontally above the top of the filterbed and through an outlet valve 6, the valve 7 being closed. This method of operation produces a clear filtrate when the filter is operated at a relatively low rate, for example, ¾ volume of juice per hour for each volume of cation-exchanger material in the upper layer 14.

The filter of Fig. 2 may also be operated at a higher rate of the order of 4 volumes of juice per hour per volume of cation-exchanger material. The filtrate remains tinted, however, requiring further treatment before use. For high rate operation, recirculated filtrate is introduced through valve 3 and recirculation member K, valves 4, 5 and 1 at the top of container A being closed. This maintains liquid under pressure above the top of the filterbed as in the case of Fig. 1.

To recondition the filter, the cover B is opened and the filter partially filled with water. Steam and air are supplied through valve 2 and bottom inlet D until the entire mass of granular material is loose and no lumps are present. This may also be done layer by layer by admitting steam and air into the annular tube S just below the upper layer 14. During this phase of the reconditioning operation, inlet valves 3 and 4 are closed.

Next, the filterbed is treated with acid which is admitted through the valve 2 and bottom inlet D instead of the steam and air. This is followed by a washing with water which is admitted through the valve 2 and bottom inlet D instead of the acid. Outlet valve 6 is closed and drainage valve 7 is open to permit the washing liquids to pass out of the foraminous straining member E. The washing rate is sufficiently high so that the particles of cation-exchanger float freely and is kept sufficiently low so that the granular material does not wash out of the filter. The wash water leaves the filter through the recirculation member K, valve 1, and duct L, valve 8 being closed.

The filterbed is then allowed to settle and is then again treated with sulphuric acid in 6% solution which enters the top of the filterbed in the reverse direction, being admitted through the valve 8 and recirculation member K. This last acid is washed out with water which enters the top of the filter through valve 8 and recirculation member K and leaves the filter through the bottom inlet D and valve 2. During this reverse washing flow, valve 1 at the top of the container is closed. Sometimes, a washing with lye should precede the treatment with acid. The filter is now reconditioned and ready for further use.

Referring to Fig. 3, there is shown an embodiment of the filter which is suitable for the purification of river water. The top and bottom of the container A are of relatively flat conical shape to withstand internal pressure.

The supporting member C is diagrammatically indicated as being a grate formed of angle bars which extend transversely across the container A in a direction perpendicular to the paper as viewed in the drawing with the apex of the angle directed downwardly. Disposed above the supporting member C are a plurality of relatively shallow layers of granular material designated 15 to 20 and a deep layer 21 in which the foraminous straining member E is embedded. Above layer 21 is a top layer 22. A manhole with a cover B is provided at the top of the container A for purposes of inspection. An air vent duct H controlled by a valve 5 is also provided.

The filterbed comprises 6 layers of gravel designated 15 to 20, each of which may have a depth of 100 mm., assuming the container A to have a height of 3500 mm. The grain size in the layers 15 to 20 decreases progressively proceeding in an upward direction from a maximum size of 40 mm. in the lowermost layer 15 to a size of 2 mm. in the layer 20. The spacing between adjacent grate bars of the supporting member C may conveniently be 5 mm.

A thick layer of fine gravel 21 having a depth of 1500 mm. rests on top of the layer 20, the grain size of the gravel in layer 20 being of the order of 1½ to 2 mm. The top layer 21 has a depth of 200 mm. and is formed of sand with a grain size of 0.5 to 1.5 mm.

The foraminous straining member E is centrally located in the thick layer 21 and is of annular shape. The foraminous straining member E is formed of two concentric cylindrical shells of suitable gauze having a mesh which provides openings of 0.4 mm. to 0.5 mm. in size. The concentric shells are suitably supported and reinforced to withstand the pressures involved, the reinforcing means being omitted from the drawing for simplicity of illustration.

Three vertical outlet ducts F, of which only two are visible in the drawing, extend upwardly from the annular foraminous straining member E to the exterior of container A for leading the filtered water to any desired point of use.

Water to be filtered is admitted through valve 3 and bottom inlet D to the bottom of the container A below the supporting grate member C, and this water passes upwardly through layers 15 to 20 and enters the foraminous straining member E through the deep layer of fine gravel 21.

Pressure is maintained above the filterbed by passing a portion of the unfiltered water upwardly through valve 4 and ducts N and L to the recirculation member K disposed in the free-board space above the filterbed within the container A. If desired, recirculated filtered water may be admitted through the valve 1 and duct L, as in the case of Fig. 1, valve 4 being closed. However, the layer of sand 22 disposed above the deep layer 21 permits the use of unfiltered water to maintain pressure above the filterbed, since the sand will accumulate impurities and enhance the filtering action with respect to water which seeps into the foraminous straining member E from above the filterbed.

The filter of Fig. 3 is washed by an upward flow of washing liquid at an extremely high flow rate as described in connection with Fig. 1.

Referring to Fig. 4, there is shown a fragment of the filter of Fig. 2, in which a pressure tight bell-shaped member open at its bottom extends downwardly into the uppermost filterbed layer 14 immediately above the foraminous straining member E. Liquid J under pressure greater than that above the rest of the filterbed is in contact with the upper surface of that portion of the filterbed which is enclosed within the bell-shaped member. This additional pressure supplements and enhances the action of the saucer-shaped baffle members G in preventing the upward flow of the fluid being filtered along the external surface of the vertical portion of outlet duct F. As previously described, such flow tends to create leakage paths leading through the filterbed directly between the free-board space at the top of the filterbed and the foraminous straining member E.

It will be apparent to those skilled in the art that many changes and modifications may be made in the specific illustrative embodiments of the invention which are herein shown and described without departing from the scope of the invention as defined in the appended claims. As used in these claims, the term "purification" of the liquid includes not only filtering as illustratively described above in connection with Figs. 1 and 3 but also includes ion exchange treatment as exemplified by the embodiment of Fig. 2.

What is claimed is:

1. A filter for the purification of liquids, comprising: a container, a filterbed of granular material filling the lower portion of said container and leaving free-board space in the upper portion thereof: means providing an inlet for liquid to be purified near the bottom of said filterbed: the grain size of said granular material decreasing progressively from said inlet upwardly to the top of said filterbed; foraminous hollow straining means embedded in the upper portion of said filterbed; a first outlet means communicating with said hollow straining means for withdrawing purified liquid from said container: a second outlet means communicating directly with said free-board space for withdrawing wash liquid from said container, and valve means for selectively opening or closing each of said outlet means.

2. A filter according to claim 1, in which said filter comprises a conduit extending from said filterbed into said free-board space, said filter further comprising laterally extending baffle means disposed within said filterbed and surrounding the exterior of said conduit for preventing the unimpeded flow of liquid through said filterbed to said straining means along the external surfaces of said conduit.

3. A filter according to claim 1, further comprising a pressure-tight enclosure open at its bottom, the bottom portion of said enclosure extending downwardly into the top portion of said filterbed above said straining means, and means for introducing further liquid into the interior of said enclosure, the pressure of said further liquid being greater than the pressure in said free-board space external to said enclosure for maintaining an increased pressure in the portion of said filterbed directly above said straining means.

4. A filter according to claim 1, additionally comprising further inlet means communicating with said freeboard space for introducing liquid under pressure above the top of said filterbed to oppose the upward pressure of said liquid introduced through said first-named inlet means.

5. A filter according to claim 4, in which said further inlet means is adapted to be supplied with liquid to be purified.

6. A filter according to claim 4, in which said further inlet means is adapted to be supplied with purified liquid derived from said first outlet means.

7. A filter according to claim 6, in which said further inlet means comprises a duct connecting said first outlet means to said further inlet means, and recirculation pump means connected in said duct for maintaining said liquid above said filterbed under pressure.

References Cited in the file of this patent

UNITED STATES PATENTS

| | | |
|---|---|---|
| 312,527 | Spitznagel | Feb. 17, 1885 |
| 626,244 | Pooler | June 6, 1899 |
| 944,194 | Jewell | Dec. 21, 1909 |
| 1,630,079 | Spalding | May 24, 1927 |
| 1,794,841 | Elfreth | Mar. 3, 1931 |
| 1,840,031 | Green | Jan. 5, 1932 |
| 2,076,934 | Burkhalter | Apr. 13, 1937 |

FOREIGN PATENTS

| | | |
|---|---|---|
| 3,859 | Great Britain | 1904 |